Dec. 27, 1966  S. L. MATLOW  3,294,662
pH METER
Filed May 16, 1962
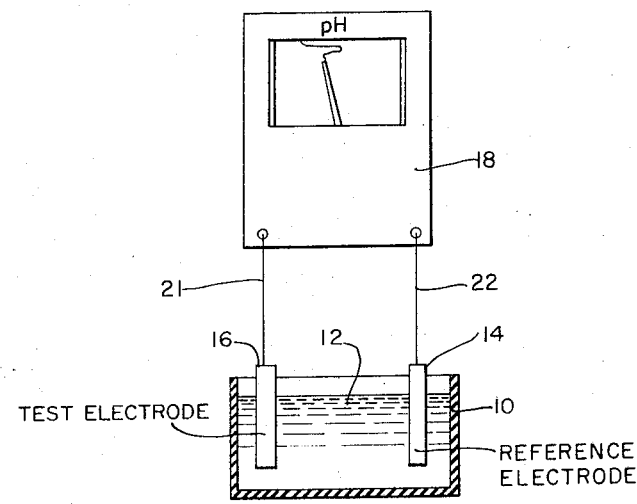
FIG. I.
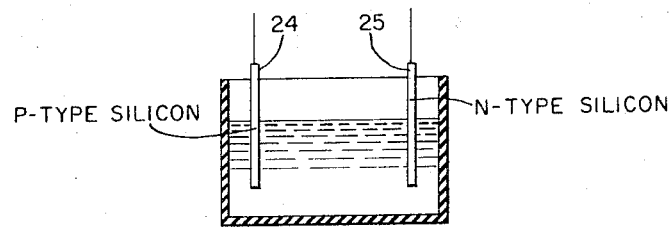
FIG. 2.
SHELDON L. MATLOW
INVENTOR
BY
ATTORNEY United States Patent Office 3,294,662
Patented Dec. 27, 1966

3,294,662
pH METER
Sheldon L. Matlow, Santa Barbara, Calif., assignor to Hoffman Electronics Corporation, a corporation of California
Filed May 16, 1962, Ser. No. 195,216
7 Claims. (Cl. 204—195)

The present invention pertains to the measurement of hydrogen ion concentration (pH), especially for high ranges of pH which cannot be accurately measured with known types of pH meters.

The pH of a liquid is defined as the negative logarithm (to the base 10) of the concentration of the hydrogen ion in gram atoms per liter. Its value ranges from approximately zero for strong acids to 14 for strong bases. Pure water has a pH of about 7. The determination of pH is of great importance in chemical process control, and it is conventional to measure its value in terms of the electrical potential developed between a pair of electrodes immersed in the liquid. However, known electrodes yielding stable and reproducible measurements of pH are limited to the lower ranges, being unsuited to the measurement of pH values greater than about 12.

The commonly used pH meter electrodes are the calomel electrode and the glass electrode. In the acid range and the low base concentration range the glass electrode is quite satisfactory. In the high base concentration range, the hydroxide ions attack the glass, producing an uncontrollable extra E.M.F. As a result of this extra E.M.F., the relationship between the observed voltage and the hydrogen ion concentration is neither linear nor reproducible.

The principal object of this invention is to provide a pH meter capable of giving reliable and reproducible indications at such high ranges, and this object is attained by the use of a test cell electrode of semiconductor material such as silicon.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a schematic diagram of one form of pH meter in accordance with the present invention.

FIGURE 2 is a similar view of a modified form of the pH meter.

Basically, and in common with known electrically operating pH meters, the invention provides a cell containing the liquid under test related as the electrolyte between a pair of electrodes known as the "test" electrode and the "reference" electrode. The electrical potential developed between the two electrodes is the net or algebraic sum of the individual electrochemical potentials developed by each electrode, and it is common practice to use as the reference electrode a material such as platinum or calomel which is itself substantially non-responsive to variations in the hydrogen ion concentration of the liquid under test.

The activity of an ion can be considered as the product of the concentration of the ion and the activity coefficient of the ion in the specific system under discussion. In dilute solutions, the activity coefficient is approximately equal to one and the concentration can be used in place of the activity. In concentrated solutions such as those with a high base concentration, the activity coefficient will be considerably different from one, and activities must be used.

In water, the product of the hydrogen ion and hydroxide ion activities is a constant (1) $\quad\quad\quad [H^+][OH^-] = K$ where the brackets indicate activities. K has the value of $1.008 \times 10^{-14}$ at 25° C. (H. S. Harned and W. J. Hamer, 55 J. Am. Chem. Soc., 2198 (1955)). Thus, when the activities of both ions are equal, they are approximately $10^{-7}$ moles/liter. From the definition of pH it follows that (2) $\quad\quad\quad pH = \log [OH^-] - \log K$ Thus, any process which measures log $[OH^-]$ can be used to measure pH.

For the reaction (3) $\quad\quad Si + 6OH^- \rightleftharpoons SiO_3^{-2} + 3H_2O + 4e^-$ the standard electrode potential, from thermodynamic data, can be calculated to be 1.7 volts. Standard electrode potentials are those which would be observed if all constituents of the system were at unit activity. Since reaction (3) is not reversible in the thermodynamic sense, the potential actually observed will differ from 1.7 volts. The lack of reversibility results from the fact that reaction (3) does not properly represent the chemistry of the reaction. The reaction probably is (4) $\quad\quad\quad Si + 2OH^- + 2p \rightarrow Si(OH)_2$ (5) $\quad\quad\quad 2Si(OH)_2 \rightarrow Si + Si(OH)_4$ where the symbol $p$ represents a valence band hole in the silicon crystal. The orthosilicic acid in reaction (5) will react with hydroxide ions to form the metasilicate anion of Equation 3.

According to classical thermodynamics, the E.M.F. for reaction (4) is (6) $\quad\quad E = E^0 - 0.02958 \log \dfrac{[Si(OH)_2]}{[Si][OH^-]^2}$ or (7) $\quad E = (E^0 - 0.02958 \log [Si(OH)_2]) + 0.05916 \log [OH^-]$ The activity of Si is one, and, therefore, the logarithm is zero. Comparison of (2) and (7) shows that the electrode potential observed will be a linear function of the pH.

Solid state theory indicates that the E.M.F. is also a function of the hole concentration in the semiconductor, but since this variation is not significant to the spirit of this invention, the theory will not be discussed here.

Although the present discussion has been in terms of silicon, the scope of this invention is not limited to silicon. Any semiconductor which will not yield insoluble reaction products in basic solutions can be used in place of silicon. The semiconductor can be of either conductivity type and of any convenient resistivity. Either single crystal or polycrystalline material can be used. Single crystal material, however, will show less aging with time than the polycrystalline material.

FIGURE 1 of the drawings represents schematically a pH meter in accordance with the present invention, and shows cell 10 containing liquid 12, which is undergoing measurement. A cathode reference electrode 14, made of calomel, platinum or platinized electrode material forms one terminal of the cell. The reference electrode can be any convenient stable electrode that is not pH sensitive. Anode test electrode 16 consists of a piece or layer of P-type silicon, such as intrinsic silicon which has been doped with an acceptor impurity to impart the P-type conductivity. The electrodes 14 and 16 are connected to a conventional potentiometer 18, of either the indicating or recording type, in the usual manner of pH meters, through lead wires 21 and 22. The electrodes can be connected to the wires by any convenient method, such as soldering or thermocompression bonding. The lead wires should be coated so that they are not in contact with the solution.

FIGURE 2 of the drawings shows a variation in that the cell electrodes 24 and 25 are respectively of P-type and N-type silicon; i.e., silicon of an opposite conductivity type is used as the reference electrode.

Examples of suitable donor and acceptor materials, and techniques for their incorporation in the lattice structure of the silicon itaself, are widely described in semiconductor literature; for example in Hunter's "Handbook of Semiconductor Electronics," published in 1956 by McGraw-Hill.

Silicon, on exposure to air or oxygen develops an oxide surface, the thickness of which changes with time. In order to control this variable, the silicon electrode should be primed by treatment with a moderately concentrated base solution, such as 5 N NaOH, for 5 to 10 minutes to remove the oxide. Other solutions and times can be used, as long as the oxide is removed. The silicon is then rinsed with a small quantity of the solution to be measured and placed in a beaker with the solution and the reference electrode. The two electrodes are then connected through a high impedance voltmeter. If the resistance of the meter is properly adjusted for the specific semiconductor used, the pH can be read directly from the meter.

It is recognized that the element silicon forms a constituent of the glass from which ordinary glass electrodes for pH meters are formed. However, the silicon content of such glass (being present in the combined form as silica, or silicon dioxide) does not confer on such glass electrodes the ability to generate a measurable electrochemical E.M.F. in strongly basic solutions; even when the electrode has been etched or primed in the standard manner.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. A pH meter comprising a high impedance voltmeter coupled to a test electrode and a reference electrode, each of said electrodes including a semiconductor material.

2. A pH meter comprising high impedance voltmeter coupled to first and second electrodes, said first electrode including a semiconductor of one conductivity type and said second electrode including a semiconductor of the opposite conductivity type.

3. A cell for pH measurement comprising a container for the liquid to be tested; and a pair of electrodes arranged to contact liquid in said container, one of said electrodes being the test electrode and consisting essentially of silicon of one conductivity type and the other electrode being a reference electrode and consisting essentially of a silicon of a different conductivity type.

4. The apparatus of claim 2 wherein said first electrode is the test electrode and has a semiconductor of P-type conductivity and said second electrode is the reference electrode and has a semiconductor of N-type conductivity.

5. The cell of claim 3 wherein said test electrode is of P-type conductivity silicon.

6. Apparatus for measuring the pH of basic liquids comprising: a reference electrode; a test electrode means for reacting with hydroxide ions consisting of a semiconductor material doped with an acceptor impurity; and an electrical circuit connecting said electrodes and having a high impedance voltmeter, said circuit being free of any means associated therewith other than said electrodes and said basic liquid for driving a current through said electrodes, whereby pH values between 12 and 14 may be measured.

7. The apparatus of claim 6 wherein said semiconductor is silicon.

References Cited by the Examiner

UNITED STATES PATENTS

| 2,563,062 | 7/1951 | Perley | 204—195 |
| 2,829,090 | 4/1958 | Eisenman et al. | 204—1 |
| 3,219,556 | 11/1965 | Arthur et al. | 204—195 |

OTHER REFERENCES

"Analytic Chemistry," vol. 33, No. 7, June 1961, 204–195, pp. 959–960.

Turner: J. of Eelectrochemical Soc., vol. 103, April 1956, pages 252–256.

Turner: J. of Eelectrochemical Soc., vol. 105, December 1958, pages 715–718.

Gobrecht et al.: Zeit. fur Elektrochemie, vol. 63, 1959, pages 541–550.

JOHN H. MACK, Primary Examiner.

JOHN R. SPECK, WINSTON A. DOUGLAS, Examiners.

T. H. TUNG, Assistant Examiner.